United States Patent [19]
Kivlighn, Jr.

[11] 3,955,013
[45] May 4, 1976

[54] NOVEL PROCESS FOR PRODUCING A THIN FILM OF GERMANIUM

[75] Inventor: Herbert D. Kivlighn, Jr., Bethpage, N.Y.

[73] Assignee: Grumman Aerospace Corporation, Bethpage, N.Y.

[22] Filed: June 21, 1974

[21] Appl. No.: 481,669

Related U.S. Application Data

[63] Continuation-in-part of Ser. No. 311,962, Dec. 4, 1972, Pat. No. 3,824,123.

[52] U.S. Cl. ................................ 427/53; 29/625; 65/30 R; 148/6.3; 427/86; 427/96
[51] Int. Cl.² .................... C03C 19/00; B05D 5/12
[58] Field of Search ................ 148/6.3; 117/124 C, 117/160, 118, 201, 227, 93.3; 427/53, 55, 86, 96, 399; 29/576, 577, 584, 625

[56] References Cited
UNITED STATES PATENTS

| 2,927,042 | 3/1960 | Hall et al. | 427/343 |
| 3,211,366 | 10/1965 | Riley | 427/86 |
| 3,401,054 | 10/1968 | Wilkes | 148/6.3 |
| 3,401,056 | 10/1968 | Wilkes | 148/6.3 |
| 3,801,366 | 4/1974 | Lemelson | 427/53 |

Primary Examiner—Cameron K. Weiffenbach
Assistant Examiner—Edith R. Buffalow
Attorney, Agent, or Firm—Morgan, Finnegan, Pine, Foley & Lee

[57] ABSTRACT

A process is disclosed for producing a thin film of elemental germanium on the surface of a germanate glass composition by means of a focused laser.

10 Claims, No Drawings

NOVEL PROCESS FOR PRODUCING A THIN FILM OF GERMANIUM

This application is a continuation-in-part of application Ser. No. 311,962, filed Dec. 4, 1972 now U.S. Pat. No. 3,824,123.

This invention is concerned with novel glasses and processes for making them. More particularly, it is concerned with the use of non-stoichiometric glasses prepared from germanium dioxide and silicon carbide in making thin films of elemental germanium.

It is known that thin films of elements can be put on non-conducting substrates by employing a vapor deposition technique. Such techniques are somewhat disadvantageous because they require special apparatus, such as high vacuum pumps, and thickness to difficult to control. Glass covered by a thin film of elemental metal, e.g., germanium, is desirable, for example, because of its highly glossy surface finish.

Thus, in the present state of the art, it would be of substantial benefit to provide a glass with a thin film of highly glossly elemental germanium on its surface.

It is a primary object of this invention to provide glasses with a thin film of highly glossly germanium precipitated in the region near the surface.

It is another object of this invention to provide a technique for placing a pattern of a thin film of glossy elemental germanium on a germanate glass composition.

Still another object of this invention is to provide a method for making semi-conducting circuit patterns.

DESCRIPTION OF THE INVENTION

According to this invention, therefore, there is provided a process for the preparation of a thin film of elemental germanium of the surface of a selected area of a germanate glass composition which includes at least 60 mole percent of germanium dioxide, said method comprising heating a selected area of said germanate glass composition with a laser of effective wave length and power in the presence of a reducing atmosphere until said thin film of elemental germanium is complete.

The germanate glass composition is one comprising germanium dioxide and a minor, non-equimolar amount of silicon carbide.

The germanate glass composition is preferably a glass in which there is from 0.85 to 0.999 mol of germanium dioxide, and the remainder, from 0.15 mol to a trace of silicon carbide.

An especially preferred glass according to this invention is one comprising from about 0.95 mol of germanium dioxide and about 0.05 mole of silicon carbide.

When used herein and in the appended claims, the term "minor, non-equimolar amount" contemplates a proportion of silicon carbide less than that theoretically required to enter into complete chemical reaction with the germanium dioxide. The upper limit of silicon carbide content will therefore be only slightly less than the equimolar amount; while the lower limit will be only a trace, e.g., about 0.001 mol per 0.999 mole of germanium dioxide.

Of course, the properties of the germanate glasses will vary over this range of silicon carbide content. For example, glasses most easily worked will have higher contents, and those with best infrared transmitting properties will have lower contents, of silicon carbide. Moreover, higher silicon carbide content glasses are a little more difficult to prepare because there is a tendency for them to fume and foam during fusion. Techniques for producing glasses in spite of fuming and foaming over this entire composition range are, however, familiar to those skilled in the art.

In any event, it is preferred to use from about 0.15 mol to a trace, and especially about 0.05 mol of silicon carbide because it is easier to obtain light colored and water-white glasses in standard equipment without excessive fuming and foaming. Especially excellent glasses will be produced at ratios of about 0.05 mol of silicon carbide to 0.95 mol of germanium dioxide.

The non-stoichiometric germanium dioxide glasses may be made by a process which comprises heating together a mixture of powdered germanium dioxide and a minor, non-equimolar amount of silicon carbide at a temperature of between about 1200° and 1600°C. in a container free of platinum and then allowing the melt to cool and solidify.

It is especially preferred to carry out such processes with mixtures of 0.85 to 0.999 mol of germanium dioxide, and the remainder, from 0.15 mol to a trace, of silicon carbide. Even more preferred mixtures comprise 0.95 mol of germanium dioxide and about 0.05 mol of silicon carbide.

The melting temperature will be between about 1200° and 1600°C., preferably between about 1300°C. and 1550°C.

The melting can be carried out in any conventional manner. An electric furnace, for example, is useful. Oxygen may be passed into the chamber until a white glow is observed at melting temperature, although it is preferred not to flush with oxygen during the actual melting process.

If a conventional platinum crucible is used, the reaction between the components appears to be quenched and the desired glass will not be obtained. Therefore, melting must be done in a container free of platinum. Any other container useful for making glass will do, and mullite ($3Al_2O_3 \cdot 2SiO_2$) serves very well.

The time required to form the glass once the mixture has been fused is not particularly critical. Of course, enough time is allowed for the chemical reaction to become substantially complete. The time will vary, as to be expected, with the temperature and with the molar ratio of components in the mixture. However, for most purposes, if the melt is held at the selected temperature for from about 15 to about 150 minutes, the desired reactions are substantially completed.

To obtain the best combination of properties, in accordance with conventional techniques, it is preferred to anneal the glasses after formation in the melt. In one manner of proceeding, the glasses are annealed between 300°C. and 500°C. for 1 hour and allowed to cool slowly to room temperature in an annealing unit.

Usually, the glasses are checked for stress distribution by examination under polarized light at room temperature before grinding and polishing by conventional techniques.

While the preferred substrate for the production of a thin film of elemental germanium is the above-noted oxygen deficient germanium glass, the thin film may be applied to any germanate glass which comprises at least 60 mole percent of germanium dioxide. These compositions may include one or more components selected from the group consisting of aluminum oxide, niobium carbide, tungsten carbide, titanium carbide, zinc oxide, barium oxide, cadmium oxide, magnesium oxide, anthracene and tantalum boride.

Also there may be employed germanate glass compositions such as those disclosed in a thesis presented by John Philip de Neufville at Harvard University which was titled "A Study of Glass Formation in the $GeO_2$-Ge System", which is hereby incorporated by reference.

Selected additives such as antimony compounds or arsenic compounds may be employed in the germanate glass substrate to alter the electrical characteristics of the thin film. Depending on the desired electrical characteristics the amount and type may be varied.

Without departing from this invention in its broadest aspects, various additives may be introduced into the instant glasses to obtain conventional results. For example, additives to impart colors may be employed. Minor proportions of other elements can also be added to provide variations.

These glasses may then be processed according to the present invention to produce a selectively precipitated thin film of elemental germanium on the surface.

A focused laser beam may be applied at an effective wave length and power to selectively form a thin film of elemental germanium on the surface of a germanate glass composition as hereinafter defined. The laser beam or the germanate glass substrate may be moved in a predetermined pattern at a controlled rate to produce a thin film at predetermined loci. This pattern may be formed as an electronic semi-conducting circuit.

The reducing atmosphere may be contained in a closed vessel which is designed to prevent the loss of the selected reducing atmosphere and the inert cooling atmosphere. Any material which transmits infra-red waves up to about 15 micron when formed as a aperture, e.g., elemental germanium, Irtran-2, lithium fluoride, calcium fluoride, sodium fluoride, barium fluoride, potassium chloride and the like may be used as a window.

Where a laser is employed, it may not be essential to cool the material in an inert atmosphere as the heating of the substrate will be effected in localized areas and the heat will be readily dissipated.

Optionally, the germanate glass compositions may be polished with an abrasive such as jeweler's rouge, alumina prior to precipitation of the thin film of germanium on the surface.

Dependent upon the intensity and time of exposure to the laser beam, resistance values can be varied from 5000 megohms to 200 megohms for the amorphous germanium films. The resistivity for the amorphous germanium films has been found to average $1.0 \times 10^5$ ohm-cm. It is possible to vary the film thickness from $5\mu m$ to $100 \mu m$, dependent upon the treatment conditions. If the surface temperature of the laser spot exceeds 500°C., the germanium film will crystallize. In this case, the resistivity decreases to an average of $1.8 \times 10^3$ ohm-cm for the same range of film thickness values.

The films can be precipitated from a base glass which has a resistance greater than $10^7$ megohms, which puts the base substituent in the insulator class. Therefore, these films have resistances in the semiconductor range on a glass that is an insulator. The films grow from the surface into the glass body.

It appears that the most important application of the present invention lies in the realm of Large Scale Integrated Circuit Technology (LSI). Present technology requires vapor deposition of a semiconducting species (usually silicon) onto an insulating substrate. A laser is then used to etch (burn) circuitry into the vapor deposited layer by cutting the excess away. One step in this process is eliminated by using laser precipitated germanium to form the circuitry initially. This will make the preparation of LSI circuitry more economical and rapid. A second application area lies in the area of a matrix of variable resistors. This would incorporate an array of variable resistors (resistance varies with film thickness) in the glass substrate and may be used for integrated circuits. Direct application for integrated circuitry is in the field, for example, of minicomputers where low power requirements prevail. It appears that the thin elemental germanium film is amorphous in its initial stages. These films may also be employed as infra-red reflectors if they are of an appropriate size. The layer may be obtained in a crystalline form by prolonged periods of heating at high temperatures. Films of Ge produced by the process of this invention are more adherent than films deposited by prior art techniques such as vapor deposition.

Generally, the laser is focused to cause a localized heating of the germanate glass to a temperature of 350°C. to 800°C. Preferred temperatures will be from about 450°C. to about 750°C., or most preferably at 400°–500°C.

DESCRIPTION OF THE PREFERRED EMBODIMENTS

The following examples illustrate the practice of this invention. The examples are illustrative only, and are not to be construed to limit the scope of the invention in any manner whatsoever.

EXAMPLE 1

A powdered mixture of 0.95 mol of electronic grade germanium dioxide and 0.05 mol of silicon carbide is melted under standard furnace conditions at 1500°C. in a new mullite crucible in an electric-fired Harrop NMR-7 unit. To keep the furnace chamber in the oxidizing state it is periodically flushed with oxygen until a clean white glow is observed at the melting temperature. No oxygen is passed into the chamber during the actual melting process. The relative viscosities of the melt are determined by using a qualitative S.A.E. method. The melt is maintained at 1500°C for 1 hour. At this temperature, there is an intensive fuming response, the glass is deep orange and it has a relative viscosity of 80W. The glass is cooled slowly to room temperature in an annealing unit.

For comparison purposes, a melt of stoichiometric germanium dioxide, i.e., no silicon carbide is added, is prepared under similar conditions. A striking contrast is noted. The glass shows no fuming tendency, but even though it is melted at its upper melting temperature, its relative viscosity is 140W, effectively twice that of the non-stoichiometric glass in its molten state.

Both glasses transmit infrared radiation well over the range of 2.5 to 4.0 microns.

For comparison purposes, a third glass sample is prepared by melting 0.95 mol of germanium dioxide and a 0.05 mol of carbon (graphite). This mixture behaves like the stoichiometric germanium dioxide glass; no fuming is observed; viscosity is relatively high; the resulting glass is water white, but graphite shows no tendency to react chemically like silicon carbide.

EXAMPLE 2

Two glasses are prepared by the procedure of Example 1. The first from a mixture comprising 0.90 mol of germanium dioxide and 0.10 mol of silicon carbide; and the second from 0.85 mol of germanium dioxide and 0.15 mol of silicon carbide. Both readily melt at 1450°C., but have high fuming activity. The viscosity of a melt of the 0.90 mol germanium-containing glass is only 65W. There is obtaind a light yellow-brown glass. Because of intense fuming and frothing, only a small amount of glass is obtained from the 0.85 mol germanium dioxide-containing glass.

EXAMPLE 3

Using the procedure of Example 1, but varying the reaction temperature, time, and annealing conditions, a series of glasses are prepared from 0.95 mol germanium dioxide and 0.05 mol of silicon carbide.

The conditions, observations and results are summarized in Table 1.

TABLE 1

Non-stoichiometric Glass From 0.95 mol Germanium Dioxide and 0.05 mol of Silicon Carbide

| Melt | Melting Conditions | Anneal | Viscosity | Description of Glass |
|---|---|---|---|---|
| 2 | 1500°C - 1 hr. | no | 85W | light yellow-brown |
| 2A | 1500°C - 4 hrs.; cooled at 25°C.; reheated, poured at 1500°C. | no | 120W | light yellow; bubbles |
| 2-B | 1300°C. - 2½hrs. | no | 80W | deep yellow-green |
| 2-C | 1200°C. - 2 hrs. | no | — | foamed, transparent |
| 2-D | 1400°C. - 2 hrs. | 500°C. | 85W | cusps formed |
| 3 | 1300°C. - 1 hr.; 1450°C. - 1 hr. | 300°C. | 90W | light yellow |
| 4 | 1300°C. - 1 hr.; 1500°C. - 1 hr. | 300°C. | 90W | light yellow |
| 5 | 1300°C. - 1 hr. | 340°C. | 85W | light yellow-green |
| 6 | 1300°C. - 1 hr.; 1500°C. - 1 hr. | 340°C. | 85W | light yellow-green |
| 7 | 1300°C. - 1 hr.; 1450°C. - 1 hr. | 340°C. | 85W | light yellow-green |
| 8 | 1300°C. - 1 hr.; 1450°C. - 1 hr. | 340°C. | 85W | light yellow-green |
| 10 | 1360°C. - 2½hr. poured at 1500°C. | 350°C. | 80W | light yellow-green |
| 11 | 1450°C. - 2 hrs. | 340°C | 80W | deep yellow-green |
| 13 | 1300°C. - 1 hr.; 1450°C. - 1 hr. | 340°C. | 80W | light yellow-green |
| 14 | 1300°C. - 1 hr.; 1450°C. - hr. | 340°C. | 80W | light yellow-green |
| 15 | 1300°C. - 1 hr.; 1450°C. - 1 hr. | 340°C. | 80W | light yellow-green |
| 16 | 1450°C. - 2 hrs. | 340°C. | 80W | seedy |
| 17 | 1375 1500°C. 2 hours; 1500°C - 45 min. | 340°C | 75W | light yellow-green |
| 18 | 1375 1525°C.- 4 hours; 1525°C. - 40 min. | 340°C. | 75W | light yellow-green |
| 19 | 1450°C. - 2 hrs. | 340°C. | 75W | light yellow-green |

The glass from melt 18 was of especially excellent quality.

EXAMPLE 4

A glass having the following composition was prepared according to the method of Example 1:

```
GeO      95
SiC      5.0
```

A small hydrogen chamber was fabricated to provide a potassium chloride entrance window and an observation port. The laser used was a model 941 carbon dioxide GTE/Sylvania unit with a maximum power of 2.5–3 watts in 10.6 μm region. At the start of the process, the hydrogen chamber containing the glass sample and the laser beam exit port were lined up so that the actuated beam passed through the KCl window and unpinged on the surface of the germanate glass substrate. Argon was then passed through the chamber to purge oxygen from the system. Immediately after this, hydrogen was introduced into the chamber and ignited at an exit chimney located on the top of the chamber. In this fashion, a dynamic hydrogen environment was created around the glass sample with the exit gas harmlessly burned off. The pressure in the chamber was therefore at 1 atmosphere and the temperature was approximately 25°C.

The laser beam was Gaussian in shape and it had a defined beam diameter of 4 mm. A 2 mm diameter spot of elemental germanium was precipitated on the above-described glass sample 0.56 mm thick in 2 minutes. No thermal cracking was observed.

EXAMPLE 5

By using the same procedure set forth in Example 4, a 2 mm spot of elemental germanium was precipitated in 30 minutes on a 7 mm thick sample of the germanate glass hereinabove described in Example 4.

The thicker sample tended to dissipate the heat and this required a longer temperature cycle.

It should be appreciated that many other variations and changes in the invention will immediately suggest themselves to those skilled in the art. Such variations and changes are deemed to be within the purview of those skilled in the art and scope of this invention as defined in the appended claims.

I claim:
1. A process for the preparation of a thin film of elemental germanium on the surface of a selected area of a germanate glass composition which includes at least 60 mole percent of germanium dioxide, said method consisting essentially of heating a selected area of said germanate glass composition with a laser beam of effective wave length and power in the presence of a reducing atmosphere until formation of said thin film of elemental germanium is complete.

2. A process as defined in claim 1 wherein said reducing gas is hydrogen.

3. A process as defined in claim 1 wherein said germanate glass composition is an oxygen deficient germanate glass which is prepared by a process which consists essentially of melting together a mixture which consists essentially of 0.85 to 0.95 moles of powdered germanium dioxide with a minor non-equimolar amount of silicon carbide at a temperature of between about 1200°C and 1600°C in a container free of platinum and then allowing the melt to cool and solidify.

4. A process as defined in claim 1 wherein the layer of elemental germanium is amorphous.

5. A process as defined in claim 1 wherein a carbon dioxide laser is employed at a wave length of about 10.6 $\mu$m and a power of about 3 watts.

6. A process for forming a semiconducting circuit pattern which consists essentially of selectively heating a germanate glass composition with a laser beam of effective wave length and power in the presence of a reducing atmosphere in a configuration that corresponds to said circuit pattern until said circuit pattern is formed.

7. A process as defined in claim 1 wherein said germanate glass composition is an oxygen deficient germanate glass which is prepared by a process which consists essentially of melting together a mixture which consists essentially of 0.85 to 0.95 moles of powdered germanium dioxide and from 0.15 moles to about 0.05 moles of silicon carbide at a temperature of between about 1200°C and 1600°C in a container free of platinum and then allowing the melt to cool and solidify.

8. A process for the preparation of a thin film of elemental germanium on the surface of a selected area of a germanate glass composition which includes at least 60 mole percent of germanium dioxide, said method consisting essentially of heating a selected area of said germanate glass composition with a laser beam in the presence of a reducing atmosphere until said selected area is heated to a temperature of 350°–800°C to cause formation of a thin film of elemental germanium.

9. A process as defined in claim 8 wherein said selected area is heated to a temperature of 450°–750°C.

10. A process as defined in claim 8 wherein said selected area is heated to a temperature of 400°–500°C.

* * * * *